United States Patent [19]

Beck

[11] 4,407,472

[45] Oct. 4, 1983

[54] HOSE HANDLER-KEEPER

[76] Inventor: Donald R. Beck, P.O. Box 178, Fort Jones, Calif. 96032

[21] Appl. No.: 93,588

[22] Filed: Nov. 13, 1979

[51] Int. Cl.³ ............................................. F16M 13/00
[52] U.S. Cl. ........................................ 248/89; 24/339; 248/58; 248/68 R
[58] Field of Search ....................... 248/58, 59, 60, 62, 248/68 R, 75, 90, 91; 24/16 PB, 17 AP, 17 A, 339; 403/169, 177, 188

[56] References Cited

U.S. PATENT DOCUMENTS

| | | | |
|---|---|---|---|
| 978,398 | 12/1910 | Rischard | 24/339 |
| 1,816,301 | 7/1931 | Sundell | 24/339 |
| 2,723,431 | 11/1955 | Di Renzo | 24/339 X |
| 2,733,024 | 1/1956 | Eden | 242/86 |
| 2,873,999 | 2/1959 | Webb . | |
| 2,896,889 | 7/1959 | Hershberger et al. | 24/339 X |
| 2,971,231 | 2/1961 | Stoddart | 24/16 PB |
| 3,088,702 | 5/1963 | Orenick et al. | 24/339 X |
| 3,099,054 | 7/1963 | Spiro | 24/16 PB |
| 3,119,587 | 1/1964 | Anderson | 248/75 |
| 3,136,515 | 6/1964 | Potruch | 248/68 R X |
| 3,382,545 | 5/1968 | Spenner | 24/339 X |
| 3,385,545 | 5/1968 | Patton | 248/68 R |
| 3,782,672 | 1/1974 | Larson | 248/302 |
| 3,946,742 | 3/1976 | Eross | 248/75 X |
| 4,002,349 | 1/1977 | Dopp | 24/339 X |
| 4,244,542 | 1/1981 | Mathews | 248/68 R |

Primary Examiner—William H. Schultz
Attorney, Agent, or Firm—Blair, Brown & Kreten

[57] ABSTRACT

Disclosed herein is a device to facilitate the coiling, storage and handling of non-collapsable yet flexible types of hoses, such as those used in conjunction with firefighting equipment. The invention comprises two, flexible, U-shaped clamps molded back to back in a figure "8" configuration. In addition, two flexible elongated straps emanate from either side of the clamping device and adjustably connect to one another providing a convenient purchase from which the coiled hose can be hung.

3 Claims, 4 Drawing Figures

HOSE HANDLER-KEEPER

BACKGROUND OF THE INVENTION

A significant portion of the hose used in conjunction with modern firefighting equipment is of the non-collapsable variety, i.e., the cross-sectional area of the hose remains constant with or without water pressure because of circular metal rings embedded in the material comprising the hose or because of a helical metal spiral wound into the hose material in a slinky like fashion. This type of hose is often used for the more heavy duty type operations, such as connecting the firetruck to the hydrant. Although firefighting equipment is the most evident use for this type of hose, there are innumerable industrial applications for non-collapsable type hose.

Storage of this type of hose is often difficult because even though flexible this type of hose resists being tightly coiled, especially in the first two convolutions. Therefor, if the innermost end of the hose is not firmly retained in position while attempting coiling, it will spring away and unravel itself because of the spring steel embedded in the hose material. Because of the spring-like qualities of this type of hose, coiling and storing it often becomes a two-man operation involving much grappling and consternation.

The following references are hose handling and clamping devices that would appear to be germane to the patentability of the present invention:
U.S. Pat. Nos. 2,733,024 Eden, 2,873,999 Webb, 3,119,587 Anderson, 3,782,672 Larson, and 4,128,220 McNeel.

The patent to Webb teaches the use of a support for a non-collapsable shower hose in which two clamps attach the hose to itself. However, the hose segments are designed to intersect normal to one another and a flexible, adjustable hanging strap is not employed as in the instant application.

The Eden patent for a combined hose carrier and storage tie teaches the use of a clamp for coiling and storing collapsable type fire hose, but is not applicable for the coiling and storage of non-collapsable type hose as is the present invention.

The other references cited further delineate the state of the art, but none appears to be substantially similar either conceptually or structurally to the present invention.

SUMMARY AND OBJECTS OF THE INVENTION

Accordingly, it is a primary object of this invention to provide a handling and storage device for non-collapsable type hoses.

It is another object of the present invention to provide a device that facilitates the coiling of non-collapsable type hoses by securing the innermost end of the hose to the first convolution of the coils so that the natural spring tension of the hose will not unravel the coils.

It is a further object of the present invention to provide two elastic, adjustable straps which encompass succeeding coils and provide a convenient loop from which to hang and store the entire length of coiled hose.

Other objects and advantages will become apparent in the following specification when considered in light of the attached drawings.

DESCRIPTION OF THE PREFERRED EMBODIMENT

Figure 1:
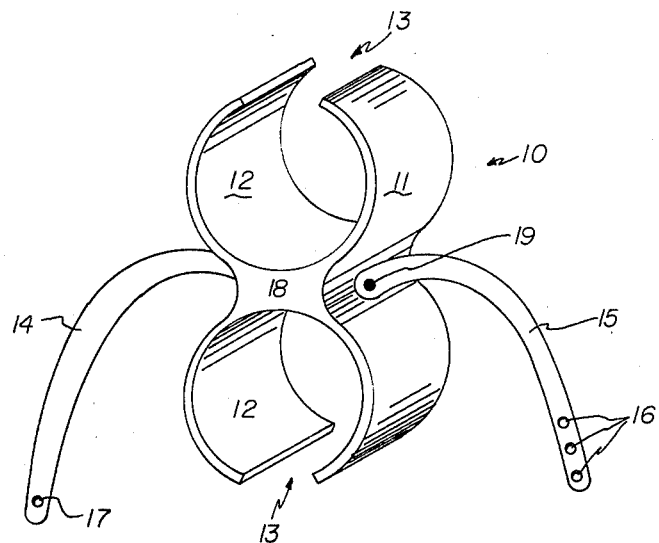
FIG. 1 is a perspective view of the present invention.

Referring now to the drawings in detail, wherein like reference characters indicate like parts throughout the several figures, the reference numeral 10 refers generally to the molded body of the present invention which can be constructed from polyurethane or other flexible, moldable type substances. Essentially the body of the clamping member 10 is comprised of two flexible, substantially U-shaped clamps molded back to back in a figure "8" configuration. Each of the two U-shaped hose receptacle clamps, which are mirror images of one another, is comprised of two curved, flexible walls 11 and 12 separated at the outward extremities by a gap 13. The two hose receptacle clamps are connected by a central, integral web portion 18 which also serves as an attachment location for the two elastic strap members 14 and 15. The two elastic strap members 14 and 15 are pivotally connected to the web area 18 by a rivet 19 or other appropriate fastener. The end of one elastic strap 14 has a mushroom-shaped protuberance 17 which can be inserted into one of a series of holes 16 located on the other elastic strap 15 thereby connecting the two straps.

Figure 2:
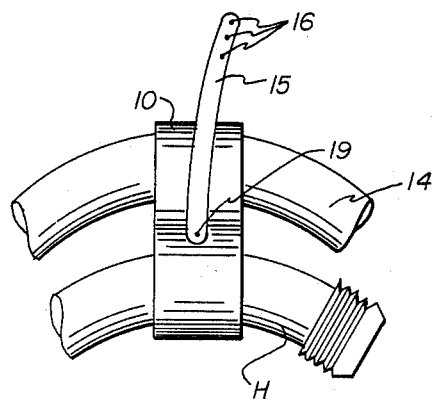
FIG. 2 is a side view of the invention's clamping hose segment.
Figure 3:
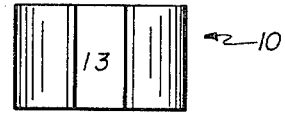
FIG. 3 is a top view.
Figure 4:
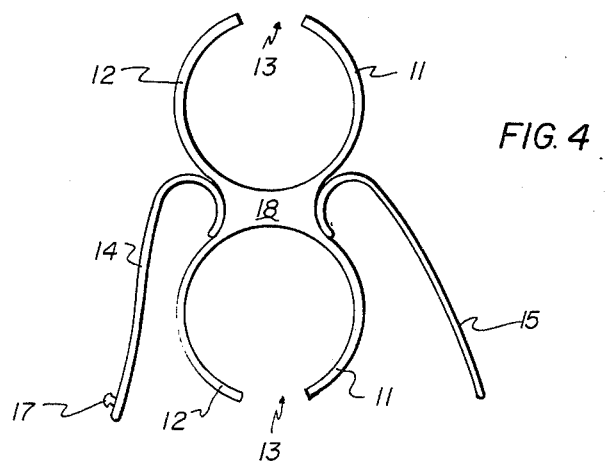
FIG. 4 is an end view.

In operation, the end of a non-collapsable type hose or tubing is forced through the gap 13 which causes the two flexible walls 11 and 12 to separate and then snap around the hose segment. The first coil of the hose is then snapped into the remaining receptacle clamp, as shown in FIG. 2. Succeeding coils of the lengths of hose are held in place by deploying and connecting the elastic, adjustable straps 14 and 15, which also provide a convenient loop from which the entire length of hose can be suspended and stored.

Having thus described the preferred embodiment of the invention it should be understood that numerous structural modifications and adaptations may be resorted to without departing from the spirit of the invention.

What is claimed is:

1. A hose handler-keeper comprising a symetrically formed coextensive upper and lower retaining clamp having diametrically opposed permanently open areas for reception therein of hose segments, and clamps joinded together by an integral intermediate web portion defining said symmetry and strap means adapted to affix further hose segments thereto and to hang said keeper on a retention device, said strap means comprises a pair of flexible strap elements disposed on opposed faces of said web, said strap elements having free ends provided with interlocking means on extremities remote from said web.

2. The device of claim 1 wherein said interlocking means comprises an upstanding protuberance supported on a stem of one strap, and a plurality of opening on another strap for insertion of said protuberance therein.

3. The device of claim 2 wherein said retaining clamps and web define a substantially figure "8" configuration with open top and bottom portions defining said open areas.

* * * * *